United States Patent Office 3,321,446
Patented May 23, 1967

3,321,446
ISOCYANATE MODIFICATION OF AN OXIDIZED POLYOLEFIN WHICH HAS BEEN TREATED WITH A HYDRAZINIUM COMPOUND
Paul R. Steyermark, Silver Spring, Md., assignor to W. R. Grace & Co., New York, N.Y., a corporation of Connecticut
No Drawing. Filed Dec. 3, 1963, Ser. No. 327,797
6 Claims. (Cl. 260—77.5)

The present invention relates to novel derivatives of oxidized polyolefins, and more specifically to novel nitrogen containing crosslinked oxidized polyolefins which possess unique and useful physical properties.

It has been found that the free carboxyl and carbonyl groups characteristically possessed by oxidized polyolefins may be reacted with hydrazinium compounds to obtain the corresponding carboxylates and Schiff's bases thereof. The insertion of such carboxylate and Schiff's base substituents on a polyolefin chain serves to enhance the polar characteristics of the polyolefin and thereby increase it's wettability and conductivity. Increased wettability and conductivity results in a polymer which is more readily dispersed in polar type solvents and which has a decreased propensity to accumulate static electric charge.

The insertion of hydrazinium groups in oxidized polyolefins, while enhancing the polar characteristic of the polymer, does little to increase the physical strength or dimensional stability of the polymer. A modification procedure which would enhance both the polar character and the physical nature of polyolefins would be most useful.

It is therefore an object of the present invention to provide a means for enhancing both the polar characteristics and dimensional stability of oxidized polyolefins.

It is a further object to provide novel highly cross-linked nitrogen containing oxidized polyolefins which possess both polar characteristic and dimensional stability at elevated temperature.

These and still further objects of the present invention will become readily apparent to one skilled in the art from the following detailed description and specific examples.

Broadly, the present invention contemplates nitrogen containing oxidized polyolefins which are prepared by reacting a hydrazinium carboxylate of an oxidized polyolefin with organic substituted isocyanates. When a polyfunctional isocyanate is used, a novel cross-linked structure is obtained which possesses a high degree of dimensional stability.

More specifically, I have found that a hydrazinium carboxylate of an oxidized polyolefin having the typical formula

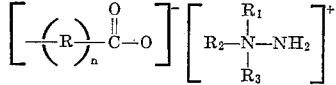

wherein, the grouping

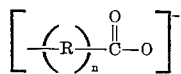

represents a carboxyl residue obtained from an oxidized polyolefin, R represents a repeating olefin unit, such as $-CH_2-$, $-\underset{\underset{CH_3}{|}}{C}H-CH_2-$, and $-CH_2\underset{\underset{CH_3}{|}}{C}H-CH_2-$ and $n$ represents the number of repeating olefin units, and $R_1$, $R_2$ and $R_3$ represent organic radicals, may be reacted with an isocyanate of the formula

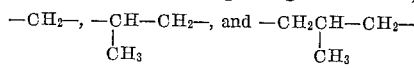

wherein $x$ has a value of 1 to 3 and R' is an organic radical, to obtain urea derivatives of the hydrazinium carboxylate through reaction of the isocyanate groups with the hydrazinium substituent. This reaction is illustrated below wherein a difunctional isocyanate is used a cross-link between the polyolefin molecules is formed:

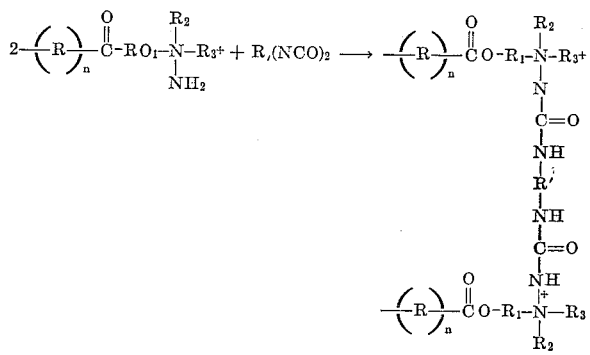

The dydrazinium compounds which are used in the practice of the present invention are prepared by dissolving an oxidized polyolefin in a solvent therefor at elevated temperatures on the order of about 70° to about 150° C. and then combining the polyolefin solution with a solution of the desired hydrazinium compound. Typical solvents which are used in this preparation are xylene, toluene, decahydronaphthalene, ethylene glycol, propylene glycol and benzene.

The hydrazinium which is to be incorporated in the oxidized polyolefin molecule is preferably in the hydroxide or alkoxide form. The hydroxide may be prepared by contacting a hydrazinium halide or sulfate with wet silver oxide or sodium hydroxide, or by passing a solution of hydrazinium halide or sulfate through a hydroxyl bearing ion exchange resin. The hydrazinium alkoxide may be obtained by reacting the halide with an alkali metal alkoxide.

Oxidized polyolefins which are used in the practice of the present invention to obtain the desired hydrazinium-olefin compound are generally well known to those skilled in the art. They may be prepared by direct oxidation of hydrocarbon polymeric chains. For example, polyolefins can be milled in the air at a temperature range of 100° to 250° C. Another method involves passing air to an oven over polyolefin maintained therein in the solid state at a temperature of from about 90° to 140° C. Still another method involves suspending particles of a polyolefin in an organic solvent and then passing air to the suspension or solution at atmospheric pressure or above at temperatures in the range of 90° to 100° C. Still another convenient way for oxidizing polyolefins involves passing air through a fluidized bed of polyolefin particles maintained at a temperature of 90° to 140° C. The method by which the oxidized polyolefins herein are obtained is not critical. However, it is preferred that the oxidized polyolefins possess from about 0.03 to about 3.0 milliequivalents of oxygen per gram. About half of this oxygen which is incorporated in the polyolefin is inherently in the form of carbonyl and carboxylate groups, the latter of which is important in the formation of the ultimate compounds disclosed herein.

The initial polyolefins which are oxidized and subsequently used in this invention may be either linear or branched polyethylene or co-polymers of ethylene with alpha-olefins in which ethylene is the major component, i.e., in excess of about 50 percent by weight. These olefins are characterized by possessing pre-oxidation densities of from about 0.91 to about 0.98 and melt indices of from about 0.00 to about 1.0.

The hydraziniums which are used in preparing the oxidized olefin hydrazinium carboxylates used in the practice of this invention have the characteristic structure.

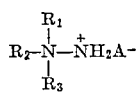

wherein $R_1$, $R_2$, and $R_3$ represent organic substituents and A is an anion.

Hydraziniums of particular interest are those wherein $R_1$, $R_2$, and $R_3$ are selected from the group comprising alkyl having 1 to 24 carbon atoms; alkenyl having 2 to 24 carbon atoms; cycloalkyl having up to 6 carbon atoms; and phenyl; alkylphenyl wherein the alkyl substituents possess 1 to 12 carbon atoms. Furthermore, $R_1$ and $R_2$ may be joined together to form a heterocyclic structure having at least 3 and not more than 8 members which may be atoms such as carbon and nitrogen. A in the above formula represents an anion such as hydroxide, halogen or sulfate. Specific examples of useful hydrazinum compounds are as follows:

N,N,N-triethylhydrazinium chloride, N,N-dimethyl-N-hexadecylhydrazinium chloride, N,N-dimethyl-N-phenylhydrazinium chloride, N,N-dimethyl-N-benzylhydrazinium chloride.

The above outlined oxidized polyolefin-hydrazinium compounds will comprise both carboxylates and Schiff's bases which may be illustrated by the following groupings:

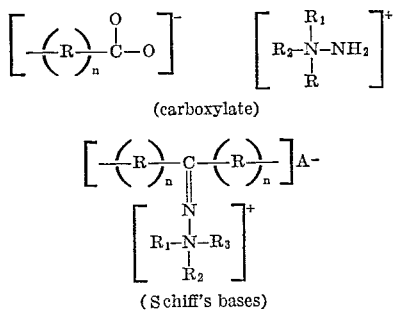

In the practice of the present invention the carboxylates are of primary interest in that they contain a free primary amino group which is open to reaction with isocyanate to form the desired urea linkage. As indicated above, the formation of Schiff's bases inherently takes place with the formation of the desired carboxylate. The presence of these Schiff's bases in no way detracts from the usefulness of the present compounds, however it is obvious the Schiff's base does not enter into reaction with isocyanate. Generally speaking, it is found that the oxidized polyolefin, contains from about 0.05 to about 2.00 milliequivalents of carboxyl group per gram, while total oxygen may range from 0.2 to 5 milliequivalents per gram. This carboxyl group content is completely adequate for producing an ultimate product having desirable physical characteristics. In other words, in oxidized polyolefin containing from about 3 to about 80 milligrams of oxygen per gram, the carboxylate groups present are adequate to produce a structure containing sufficient urea linkages to impart desired physical properties thereto.

Isocyanates which are used in the practice of the present invention possess the general formula:

wherein R' may represent organic radicals including alkyl and alkylene having from 1 to 12 carbon atoms; phenyl and phenylene, alkylphenyl and alkylphenylene wherein the alkyl substituents number from about 1 to about 3 and alkyl substituents possess from about 1 to about 3 carbon atoms; alkylphenylalkyl wherein the alkyl substituents contain from 1 to 3 carbon atoms; as well as phosphorous and silicon containing isocyanates which possess a wide variety of organic substituents. $x$ has a value of 1 to 3.

Specific examples of mono and polyfunctional isocyanates which are particularly useful in the practice of the present invention are toluene diisocyanate, phenyl isocyanate, hexamethylene diisocyanate, benzoyl isocyanate, phenyl phosphor-diisocyanatidate, and dimethyl-diisocyanatosilane.

The presently intended urea derivatives of hydrazinium containing polyolefins may be prepared by mixing solutions of the desired isocyanate and hydrazinium containing olefin at temperatures ranging from about room temperature (25° C.) to about 200° C. Specific solvents which may be used in the reaction are xylene, toluene, tetrahydronaphthalene, diethylene glycol dimethyl ether, acetonitrile, dimethyl formamide, and dimethyl sulfoxide. Practically any inert hydrocarbon solvent having a boiling point of from about 80 to about 200° C. may be effectively used.

Reaction between the carboxylate and isocyanate may also be achieved by admixing the reactants while the carboxylate is heated to a temperature above its softening point, i.e., from about 140° to 200° C. Generally speaking, the amount of isocyanate reacted with the hydrazinium containing polyolefin depends on the type of structure desired as well as the amount of hydrazinium which is present in the oxidized polyolefin in the carboxylate form. Theoretically the maximum amount of isocyanate added would be that stoichiometric amount required to react with all of the primary amino groups which are present in the polyolefin carboxylate compound. However, in many instances it is desired to react fewer than the maximum theoretical number present, in that total reaction may result in a crosslinked structure which is too brittle for practical application. In any event, the precise amount of isocyanate reacted will depend on the physical properties desired in the ultimate product. We have found that as little as about 50% of the theoretical amount of polyfunctional isocyanate which will react with a given carboxylate will induce substantial improvement in the finished polymer.

The exact time required for reaction to take place between the isocyanate and the carboxylate depends on the particular isocyanate used as well as the extent of the reaction required. However, as a general rule, using the above temperatures and solvents from about 10 to about 60 minutes is generally adequate to obtain complete reaction of the isocyanate and the primary amino groups in the hydrazinium carboxylates.

The solutions of isocyanates and carboxylate may be used in the present invention generally contain from about 10 to about 100 parts of solvent per part by weight of reactant. It is found that when the reactants are present in this general range of concentration a reaction mixture is obtained which is easy to handle using conventional equipment.

Subsequent to complete reaction the desired reaction product is recovered by any one of several techniques depending upon the type of derivative obtained. For example, recovery of the resulting product may frequently be achieved by cooling the reaction mixture the temperature below which the product precipitates. On the other hand, air evaporation of the solvent under mild heating conditions with or without vacuum will result in isolation of the desired product.

The products which are obtained in accordance with the present invention may be characterized as urea derivatives of hydrazinium-oxidized polyolefin carboxylates. The examination of the products using infra-red analytical techniques indicates the characteristic absorption pattern exhibited by urea linkages.

As indicated above, when di-functional isocyanates are reacted with the polyolefin practically any degree of crosslinking may be obtained up to the theoretical amount of primary nitrogen present. This results in changes varying from mere increases in melting point up to the production of totally thermoset products which decompose without melting at temperatures up to about 300° C. These products because of their polar type substituents in the form of Schiff's base and hydrazinium carboxylates groups possess a high degree of wettability and conductivity. Therefore, the products find wide application as molding materials for the formation of numerous articles which require these characteristics.

Having described the broad aspects of the present invention, the following specific examples are given to illustrate embodiments thereof.

*Example I*

A 20 gram sample of oxidized polyethylene which contained 0.49 milliequivalent of free carboxyl groups per gram was dissolved in 400 milliliters of xylene. The initial unoxidized polyethylene possessed a density of 0.95 and a melt index of 0.00. To the polyethylene-xylene solution, a solution comprising 29 meq. of N,N-dimethyl-N-hexadecylhydrazinium hydroxide dissolved in 25 ml. of diethylene glycol was added. The combined solutions were well mixed and subsequently cooled from an initial temperature of 120° C. to a temperature of about 0° C. A precipitate formed which was removed from the reaction medium by filtration and was washed with toluene and acetone. Analysis indicated 49% of the starting hydrazinium hydroxide and reacted with the oxidized polyethylene. The solid precipitate which was obtained weighed 24.2 grams, representing a substantially quantitative yield. This polyethylene hydrazinium derivative possessed a nitrogen content of 1.73% which is equivalent to 0.62 meq. of hydrazinium per gram of oxidized polyolefin. The difference of 13 milliequivalents per gram which existed between the initial titrated value for carboxyl and the final value was deemed to be in the form of Schiff's base substituents. The infra-red absorption spectrum indicated a weak absorption of 1640 cm.$^{-1}$, a strong absorption at 1565 cm.$^{-1}$, a medium intensity absorption at 1715 cm.$^{-1}$, and a broad band at 3134 cm.$^{-1}$.

*Example II*

One gram of phenyl isocyanate was added to a solution of 1.2 grams of the N,N-dimethyl-N-hexadecylhydrazinium derivative of oxidized polyethylene prepared in Example I in 90 ml. of xylene at 70° C. After 15 minutes, the solution was allowed to cool at room temperature, and was further cooled at 0° C. A precipitated material was collected, washed with ether, and dried. It weighed 0.7 gram. The nitrogen value of the reacted product was found to be 2.8% compared with 1.73 for the starting hydrazinium derivative of oxidized polyethylene. This material has a strong infra-red absorption at 3300 cm.$^{-1}$ and 1710 cm.$^{-1}$, and a moderately strong band at 1645 cm.$^{-1}$ which is consistent with the following structure.

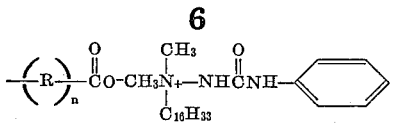

Aromatic substitution was shown by sharp bands at 1600, 1500, 752, and 690 cm.$^{-1}$. Under the same conditions of reaction, oxidized polyethylene does not react with phenyl isocyanate.

*Example III*

1.7 grams of the N,N-dimethyl-N-hexadecylhydrazinium derivative prepared in Example I and 2.2 grams of toluene 2,4-diisocyanate was reacted in 80 ml. of xylene at a temperature of 90° to 120° C. for one hour. The product was isolated from the reaction mixture in the same manner set forth in Example II, whereupon 1.7 grams of dry product was obtained. This material showed signs of softening above 250° C. and gradually decomposed without melting at about 300° C. The material had a very strong infra-red absorption in the carbonyl region, and at about 3300 cm.$^{-1}$: In addition, it had a strong band at 2300 cm.$^{-1}$ indicating a free isocyanate group. The nitrogen value of the product was 3.77%.

*Example IV*

A 34 gram sample of N,N-dimethyl-N-hexadecylhydrazinium derivative of oxidized polyethylene prepared in a manner similar to that set forth in Example I was allowed to react at 155° C. with increasing amounts of toluene 2,4-diisocyanate in a heated reactor equipped with means to measure an increase of mixing torque which occurs with reaction (a Brabender Plastograph). After 3.3 grams toluene di-isocyanate had been added, at a temperature of 155° C. measured torque increased from 0 to 500 metergrams. Subsequently, another 3.5 gram portion of toluene diisocyanate was added and the torque increased to 1000 and then immediately fell to 0 because of solidification of the reaction product. The product was expelled from the mixing chamber as a powdery, dry, tan colored solid which decomposed slightly below 300° C.

The above specific examples clearly indicate that reaction products may be obtained by the reacting of isocyanates with hydrazinium carboxylates of oxidized polyolefins. The derivatives may possess crosslinked, i.e., thermoset properties which are substantially different than those of the initial polyolefin.

I claim:
1. A modified polyolefin prepared by:
   (1) Reacting in the presence of a solvent at a temperature of from about 70° C. to 150° C.
       (a) an oxidized polyolefin containing from about 0.3 to about 3.0 milliequivalents of oxygen per gram of oxidized polyolefin, with
       (b) a hydrazinium compound having the formula

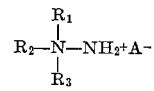

wherein $R_1$, $R_2$ and $R_3$ are selected from the group consisting of alkyl groups containing from 1 to 24 carbon atoms, alkenyl groups containing from 2 to 24 carbon atoms, cycloalkyl groups having up to 6 carbon atoms, phenyl and alkylphenyl, wherein the alkyl portion of the alkylphenyl group contains from 1 to 12 carbon atoms; and wherein A is an anion selected from the group consisting of hydroxide, halogen and sulfate, and;
   (2) Thereafter reacting at a temperature of from about 25° C. to 200° C.
       (c) the product resulting from reaction (1) with
       (d) an organic isocyanate having the formula

wherein R' is an organic radical containing atoms selected from the group consisting of carbon, hydrogen, phosphorus, silicon, and oxygen, and where R' contains from 1 to 12 carbon atoms; and wherein $x$ represents an integer of from 1 to 3.

2. The composition of claim 1 wherein the isocyanate is toluene diisocyanate.

3. The composition of claim 1 wherein the isocyanate is phenyl isocyanate.

4. The composition of claim 1 wherein the polyolefin has an initial non-oxidized density of from about 0.91 to about 0.98 and a non-oxidized melt index of from about 0.00 to about 1.0.

5. The composition of claim 1 wherein the oxidized polyolefin is selected from the group consisting of oxidized polyethylene and oxidized ethylene-alpha olefin copolymers containing at least 50% by weight ethylene.

6. The composition of claim 1 wherein the hydrazinium compound is N,N-dimethyl-N-hexadecyl hydrazinium hydroxide.

References Cited by the Examiner
UNITED STATES PATENTS

| | | | |
|---|---|---|---|
| 2,955,108 | 10/1960 | Omietanski | 260—501 |
| 3,152,107 | 10/1964 | Mullier | 260—94.9 |
| 3,175,996 | 3/1965 | Gregorian | 260—94.9 |
| 3,210,323 | 10/1965 | Bush et al. | 260—77.5 |

DONALD E. CZAJA, *Primary Examiner.*

LEON J. BERCOVITZ, GEORGE F. LESMES,
*Examiners.*

F. McKELVEY, M. C. JACOBS, *Assistant Examiners.*